Feb. 1, 1955

F. D. RIFNER 2,700,826

HEIGHT GAUGE

Filed July 19, 1952

INVENTOR.
FRANK D. RIFNER
BY
*Henry J. Dybvig*
HIS ATTORNEY

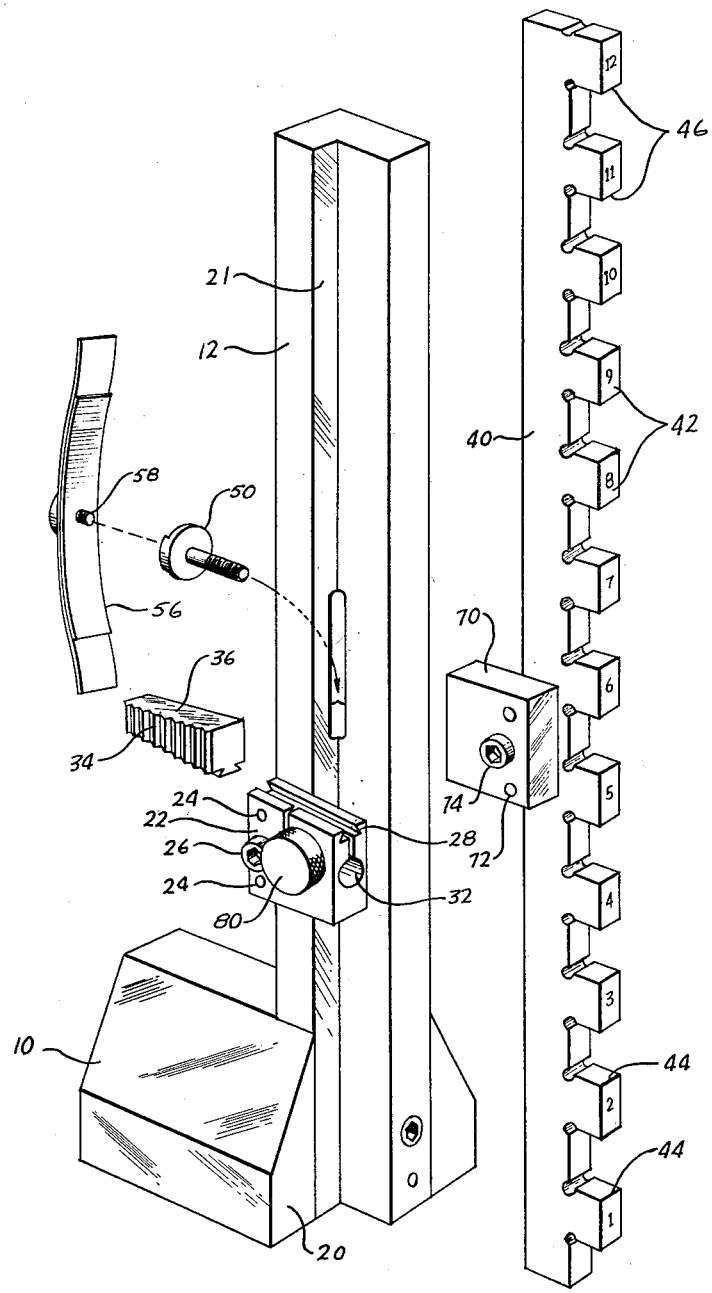

United States Patent Office 2,700,826
Patented Feb. 1, 1955

2,700,826

HEIGHT GAUGE

Frank D. Rifner, Trotwood, Ohio, assignor to Robert A. Mayne, Dayton, Ohio

Application July 19, 1952, Serial No. 299,791

7 Claims. (Cl. 33—169)

This invention relates to a height gauge and more particularly to a height gauge adapted for use with "Joe" blocks, although not necessarily so limited.

Tool makers and other craftsmen find it necessary to make accurate measurements. Oftentimes, these precision measurements are made in association with a surface plate. The object to be measured is placed on the flat surface of a surface plate. The height is compared with a height gauge which may be positioned on the surface plate and provided with accurate height measurements. Height gauges having stepped levels associated with micrometer adjusting means have been used in the past. Whenever micrometer adjustments are used, the cost of production of the instrument is increased. Furthermore, there are chances of error, first in the calibration of the instrument, error in its use and finally, error in reading the instrument.

For some purposes, stacks of Johansson blocks, generally referred to in the trade as "Joe" blocks have been used. This, however, necessitates stacking the blocks and if many blocks are used, there is a chance of error due to tolerances in the measurements of the blocks. Although the errors caused by tolerances in the size of the blocks are generally referred to as compensating, there is always a chance that a group of blocks may be selected wherein the error is cumulative.

An object of this invention is to provide a height gauge that has a slidably mounted notched bar, the distance between the corresponding surfaces of the notches being constant, subject to tolerances. In order to avoid accumulation of errors due to tolerances, the corresponding surface of each notch is held to predetermined tolerances with respect to the corresponding surface of every other notch on the bar. Furthermore, this height gauge is adapted for use with one or more "Joe" blocks used in supporting the bar in any position within the limits of the distance between two adjacent notches. This has been accomplished by providing a clearance in the vicinity of the lower end of the notched bar for the insertion of one or more "Joe" blocks for supporting the lower end of the bar.

Another object of this invention is to provide a standard for a height gauge, which standard is provided with an anvil or a ledge mounted in association with a stop on a slidable notched bar, which anvil is adapted to support one or more "Joe" blocks, to thereby hold the notched bar in any adjusted position.

Other objects and advantages reside in the construction of parts, the combination thereof and the mode of operation, as will become more apparent from the following description.

In the drawings,

Figure 3 is an exploded view of the height gauge.

Figure 1:
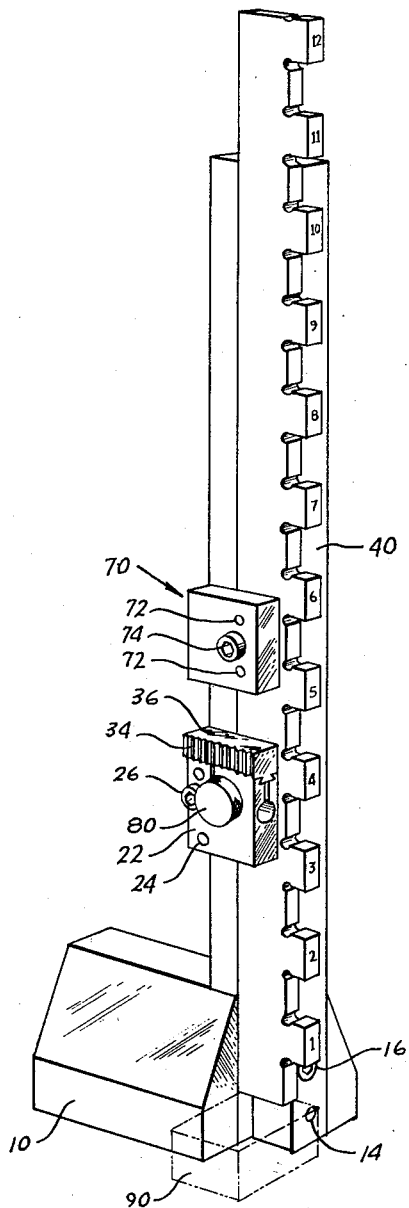
Figure 1 is a perspective view of a height gauge having a "Joe" block mounted between the lower end of the notched bar and the supporting surface.

Referring to the drawings, the reference character 10 indicates a base that is provided with a flat bottom surface. This base may be of any suitable configuration aside from the functional requirements thereof. A standard 12 is fixedly attached to the base 10 and is substantially L-shaped in cross sectional area. The L-shaped cross sectional area results in a rabbet extending from top to bottom. This standard 12 is mounted in fixed position with respect to the base 10 by the use of an aligning pin 14 and a screw 16. The aperture for the screw is countersunk, so that the head of the screw may be substantially flush with the surface of the standard 12. The standard 12 should extend at right angles with respect to the bottom surface of the base 10. This is very important, especially when used as a precision instrument. For example, if the tolerance of the height gauge is held within twenty-millionth of an inch, it may readily be seen that a slight variation of the angle that the standard forms with the base of the supporting surface will result in an error of more than twenty-millionth of an inch.

As may best be seen by referring to Figure 3, the base 10 is provided with a cut-away wall 20 that is substantially flush with the edge 21 of the standard 12. Thereby, an exposed corner is provided, as will appear more fully later.

The standard 12 has mounted on one side thereof an anvil 22. This anvil is secured to the standard by means of an aligning pin 24 and a suitable screw 26 threadedly engaging the standard 12. The upper margin of the anvil 22 is provided with a dovetailed groove 28. One-half of this portion is provided with a longitudinal slot 30 that merges into an aperture 32. The top of anvil 22 and the dovetailed groove 28 slope slightly.

Figure 2:
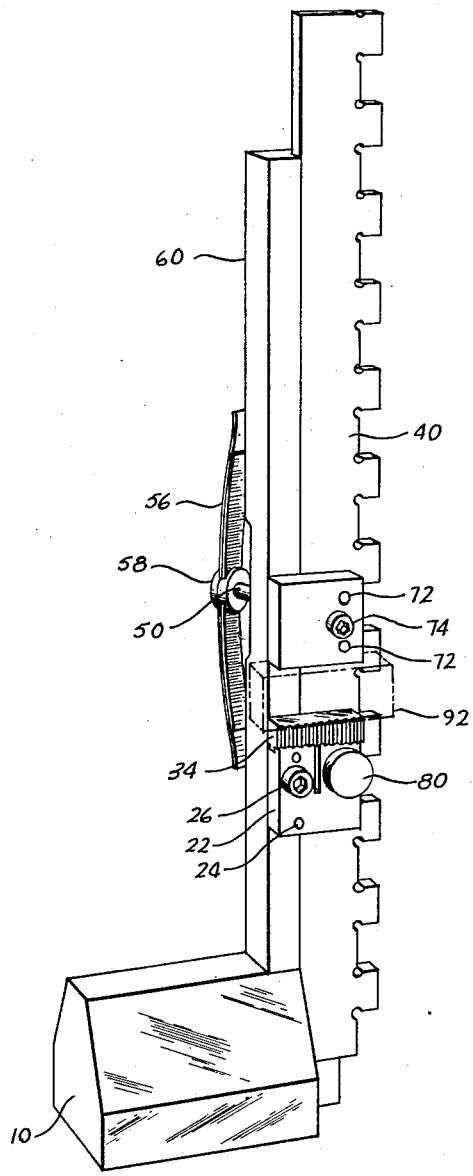
Figure 2 is another perspective view showing a "Joe" block mounted upon an anvil for supporting a notched bar in elevated position.

A block 34, provided with a dovetail and tapering from one end to the other, has its dovetail mounted in the dovetailed groove 28, as clearly seen in Figures 1 and 2. The elevation of the top surface 36 of the block 34 may be raised or lowered by adjusting the block 34 to the right or left with respect to the anvil 22, as viewed in Figures 1 and 2. In any adjusted position, the top surface 36 is parallel to the base or bottom member 10.

As may best be seen by referring to Figure 3, the anvil 22, together with the block 34, cooperate with the standard 12 to form a channel. A notched bar 40 is seated in the corner or rabbet of the standard 12 and positioned in the channel formed between a portion of the standard 12 and members 22 and 34. This bar 40 is provided with a plurality of projections 42. As clearly seen in Figures 1 and 3, these projections are numbered consecutively from 1 to 12. The top surface 44 of each projection is a predetermined distance from the adjacent top surface of an adjacent projection. In the device shown herein, the distance between the top surface of adjacent projections is one inch plus or minus tolerances. The top surface 44 is finished and is parallel to the bottom of the base 10. The lower surface 46 may also be finished, although not necessarily so, as will appear more fully later.

The bar 40 is mounted for slidable movement with respect to the standard 12. This bar 40 is held in position by a suitable screw 50 projecting through a diagonally disposed slot 52 in the standard 12 and threadedly engaging an aperture (not shown) in the bar 40. The head of the screw 50 is provided with a slot 54 adapted to receive a leaf spring assembly 56 held in position by a screw 58 threadedly engaging the end of the screw 50, so as to resiliently bias the bar 40 into the corner or rabbet of the standard 12. The spring assembly 56 engages the corner 60 of the standard 12 opposite the rabbet for the bar 40. Due to the arrangement of the slot 52, it can readily be seen that the bar 40 may be raised or lowered with respect to the standard 12, permitting up and down movement of the screw 50 throughout the length of the slot 52. The spring 56 at all times biases the bar 40, so as to snugly hold the bar 40 in the rabbet and in contact with the two contacting surfaces of the standard 12.

The bar 40 is provided with a lug 70 retained in position by a pair of pins 72 and the screw 74, threadedly engaging an aperture in the bar 40. The lower edge of lug 70 contacts the surface 36 when the lower end of the bar 40 rests upon top of the surface supporting the height gauge. In the event the top surface 36 is slightly too high or slightly too low, the screw 80 is loosened, the block 34 adjusted so that the top surface 36 has the proper height and then the screw 80 is again tightened to lock the block 34 in position.

When the height bar is used and the desired height to be measured is expressed in even inches, the bar 40 is then adjusted so as to rest upon the measuring surface. For example, if the height desired is 8 inches, the desired height then is found by measuring the distance from the surface supporting the height gauge to the top surface 44 of the projection #8. Most of the time, however, the desired measurement is a fraction of an inch or one or more inches plus a fraction. In order to be able to measure from the top surface 44 to the base, the bar 40 is raised a distance corresponding to the desired fraction of an inch. For example, if the height to be measured is 8.6375, it is then necessary to raise the bar 40 through a distance equal to .6375. This measurement should be accurate. Instead of using some type of micrometer adjustment for adjusting the bar, a "Joe" block or a plurality of "Joe" blocks may be used. The height of the "Joe" block or the plurality of blocks should equal .6375 inch for carrying out the illustration set forth above. In Figure 1 a "Joe" block 90 is mounted upon the support for the height gauge and provides a rest or a base for the lower end of the notched bar 40. The distance from the base or the support of the height gauge to the top surface 44 of the projection #8 is now 8.6375 inches.

Instead of mounting the "Joe" block as shown in Figure 1, a "Joe" block may be positioned on the block 34, as shown in Figure 2, where the block 92 is mounted on the top surface 36 of the block 34 and the bar 40 is held at the proper height by lug 70 resting on the top surface of the "Joe" block. The distance from the surface supporting the height gauge to the surface 44 of each of the projections, is equal to the number of inches as indicated by the respective projections plus the thickness of the "Joe" block 92.

The use of this height gauge is not limited to the use of one "Joe" block. A fractional inch may be obtained by combining two or more blocks to obtain the desired height. Furthermore, in the event the available blocks cannot be combined to obtain the fractional inch, it may be possible to combine blocks so as to obtain a height equal to one inch plus the fractional inch. For example, if the desired distance is expressed in inches plus a very small fraction of an inch, as for example, one one-thousandth of an inch, "Joe" blocks may possibly be combined so as to obtain a height of one inch plus this fraction of an inch. If so, the number of inches is indicated by the numbers on the projection, having one inch added thereto to obtain the proper height to the top surfaces of the respective projections.

The lower surface 46 may be finished or it may remain unfinished. By mounting the slot 52 in substantially the center of the height of the standard 12, the bar 40 may be inverted by eliminating the projection 70. By inverting the bar 40, the top surface 44, as shown in Figures 1, 2 and 3, would then become the under side of the projections. By this arrangement, it is possible to only finish one side of each projection and at the same time provide a height gauge wherein the measurements may be measured to the top surface of the projection or to the bottom portion of the projection by merely inverting the bar 40.

After the notched bar has been raised and supported on a "Joe" block or "Joe" blocks, either as disclosed in Figure 1 or as disclosed in Figure 2, the notched bar may be locked in position in any suitable manner, as for example, by the use of a set screw or a clamp or by any other locking mechanism. After the notched bar has been locked in position, the height gauge may be moved without the "Joe" block or "Joe" blocks, with the notched bar held in a locked position.

The bar 40 may be made from any suitable material. It may be made from steel. The bar may also be made from granite, which may consist of crystalline rock composed of quartz, feldspar and mica, or other stone, which has several desirable characteristics. One of these is that the granite bar will not be influenced by age, whereas a ferrous bar or a steel bar made out of certain types of material may be affected by age. Furthermore, granite has other advantages, such as coefficient of expansion, coefficient of elasticity.

For the purpose of illustration, a height gauge for measuring 12 inches has been shown. This height gauge may be made in any suitable height. Furthermore, the anvil on the side of the standard and the lug on the side of the notched bar 40 may be omitted, in which event the "Joe" blocks are then inserted under the bottom of the notched bar to obtain the desirable fractional inch. The rabbet has been shown as a part of the standard. A rabbet or guide could be provided in the notched bar, cooperating with a suitable portion of the standard.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A height gauge for use with surface plates and "Joe" blocks, said height gauge including a base having a flat bottom adapted to rest on the surface of the surface plate, a standard mounted on the base, said standard cooperating with the base to form a vertically disposed rabbet, said standard having a diagonally disposed slot extending from the bottom of a portion of the rabbet, a notched bar mounted in the rabbet, said notched bar having a threaded aperture, a screw threadedly engaging the threaded aperture, and projecting through the slot in the standard, and resilient means for engaging the screw for holding the notched bar in contact with the rabbet in the standard, the distance between corresponding surfaces of the notches being uniform throughout the length of the notched bar, said notched bar being slidably mounted with respect to the standard so that fractional increments of the distance between adjacent corresponding surfaces of the notches may be measured by "Joe" blocks mounted under the lower end of the notched bar so as to hold the notched bar in predetermined spaced relation from the surface of the surface plate.

2. A height gauge according to claim 1, wherein the notched bar consists of a stone bar.

3. A height gauge for use with surface plates and "Joe" blocks, said height gauge including a base having a flat bottom adapted to rest on the surface of the surface plate, a vertically disposed standard mounting on the base, said standard having a vertically disposed rabbet, said standard having a slot extending from the rabbet, a notched bar mounted in the rabbet, the notches forming projections that are equally spaced throughout the length of the notched bar, resilient means for biasing the notched bar into the rabbet, said resilient means including a member projecting through the slot in the standard for biasing the notched bar into the rabbet, an anvil fixedly attached to one side of the standard and extending along one side of the notched bar, said anvil having a horizontally disposed top surface, and a lug fixedly attached to one side of the notched bar, the lug contacting the anvil when the height gauge including the notched bar rests on the flat surface of a surface plate, the notched bar being held in an elevated position by a "Joe" block mounted between the anvil and the lug by a distance equal to the height of the "Joe" block.

4. A height gauge according to claim 3, wherein the anvil consists of two members, one of which is fixed and the other adjustably mounted, the fixed member being permanently attached to the standard, the fixed member having an inclined surface, the adjustable member tapering from one end to the other and resting upon the inclined surface of the fixed member, the taper being such that it compensates for the slope of the inclined surface of the fixed member, the height gauge being calibrated by the adjustment of the adjustable member with respect to the fixed member, and means for locking the two members together in adjusted position.

5. A height gauge according to claim 3, wherein the resilient means for holding the notched bar includes a screw threadedly engaging the notched bar, a spring associated with the screw for engaging a portion of the standard for holding the notched bar in the rabbet.

6. A device according to claim 3, wherein only one surface of each projection extending between the notches is finished, the notched bar being reversible in the standard so that the finished surface when the notched bar is mounted in one position in the standard is the upper surface of each projection and when the notched bar is reversed the underside of each projection has the finished surface.

7. A height gauge according to claim 3, wherein the notched bar consists of a stone bar.

References Cited in the file of this patent

UNITED STATES PATENTS

| Number | Name | Date |
|---|---|---|
| 2,410,877 | Hall | Nov. 12, 1946 |
| 2,515,583 | Bennett | July 18, 1950 |